United States Patent
Welk et al.

(10) Patent No.: US 11,565,653 B2
(45) Date of Patent: Jan. 31, 2023

(54) VEHICLE OCCUPANCY-MONITORING SYSTEM

(71) Applicant: Aptiv Technologies Limited, St. Michael (BB)

(72) Inventors: Douglas L. Welk, Rossville, IN (US); Timothy A. Suda, Avon, IN (US)

(73) Assignee: Aptiv Technologies Limited, St. Michael (BB)

( * ) Notice: Subject to any disclaimer, the term of this patent is extended or adjusted under 35 U.S.C. 154(b) by 186 days.

(21) Appl. No.: 17/131,606

(22) Filed: Dec. 22, 2020

(65) Prior Publication Data

US 2021/0206343 A1    Jul. 8, 2021

Related U.S. Application Data

(60) Provisional application No. 62/956,951, filed on Jan. 3, 2020.

(51) Int. Cl.

| | | |
|---|---|---|
| *G06F 17/00* | (2019.01) | |
| *B60R 22/48* | (2006.01) | |
| *B60K 35/00* | (2006.01) | |
| *G08B 7/06* | (2006.01) | |
| *B60Q 3/70* | (2017.01) | |

(52) U.S. Cl.
CPC .............. *B60R 22/48* (2013.01); *B60K 35/00* (2013.01); *G08B 7/06* (2013.01); *B60K 2370/1529* (2019.05); *B60Q 3/70* (2017.02); *B60R 2022/485* (2013.01);
(Continued)

(58) Field of Classification Search
None
See application file for complete search history.

(56) References Cited

U.S. PATENT DOCUMENTS

| 7,359,527 B2 | 4/2008 | Breed et al. |
|---|---|---|
| 10,391,972 B1 | 8/2019 | Chengalva |

(Continued)

FOREIGN PATENT DOCUMENTS

| CN | 204641663 U | 9/2015 |
|---|---|---|
| CN | 105459950 A | 4/2016 |

(Continued)

OTHER PUBLICATIONS

"Extended European Search Report", EP Application No. 20217784.6, dated May 28, 2021, 7 pages.

(Continued)

*Primary Examiner* — Brent Swarthout
(74) *Attorney, Agent, or Firm* — Sawtooth Patent Group PLLC

(57) ABSTRACT

The techniques of this disclosure relate to a vehicle occupancy-monitoring system. The system includes a controller circuit that receives occupant data from an occupancy-monitoring sensor of a vehicle. The controller circuit determines an occupancy status of respective seats in a cabin of the vehicle based on the occupancy-monitoring sensor. The controller circuit indicates the occupancy status of the respective seats on a display located in a field of view of occupants of the vehicle. The display is integral to one of a roof light module, a door panel, or a headliner of the cabin. The system can improve passenger safety by alerting the operator and other occupants about the occupancy status of the passengers.

20 Claims, 8 Drawing Sheets

(52) U.S. Cl.
CPC ............... *B60R 2022/4816* (2013.01); *B60R 2022/4858* (2013.01); *B60R 2022/4866* (2013.01)

(56) References Cited

U.S. PATENT DOCUMENTS

| | | | |
|---|---|---|---|
| 10,457,208 B1 | 10/2019 | Moffa | |
| 2009/0132128 A1* | 5/2009 | Marriott | B60R 22/48 701/45 |
| 2013/0021476 A1* | 1/2013 | Trummer | B60R 22/48 348/148 |
| 2014/0085070 A1* | 3/2014 | Schoenberg | B60Q 1/00 340/457.1 |
| 2014/0104053 A1* | 4/2014 | Clark, Jr. | B60Q 1/50 340/457.1 |
| 2018/0033277 A1* | 2/2018 | Entis | G08B 21/02 |

FOREIGN PATENT DOCUMENTS

| | | |
|---|---|---|
| CN | 107599904 A | 1/2018 |
| CN | 109153356 A | 1/2019 |
| DE | 102015218588 | 3/2016 |
| JP | 2016012117 A | 1/2016 |

OTHER PUBLICATIONS

"Foreign Office Action", CN Application No. 202110004102.0, dated Sep. 5, 2022, 18 pages.

* cited by examiner

VEHICLE OCCUPANCY-MONITORING SYSTEM

CROSS-REFERENCE TO RELATED APPLICATIONS

This application claims the benefit under 35 U.S.C. 119(e) of U.S. Provisional Application No. 62/956,951 filed Jan. 3, 2020, the disclosures of which are hereby incorporated by reference in their entirety herein.

BACKGROUND

Modern automotive vehicles typically include seat-belt-latch sensors that detect when the seat belt is properly latched and alert a driver of the vehicle when any occupant's seat belt is not latched. The alert is typically a combination of an audible chime and a visible icon that is displayed in a field of view of the driver, with limited or no visibility to the other occupants of the vehicle. In some vehicles, a transitory icon is displayed to the driver for a brief period after all of the occupied seats are determined to have properly latched seat belts, after which the display is removed from the driver's view. These types of alerts are not suitable for driverless vehicles where none of the occupants is a driver responsible to remind the other occupants to latch their seat belts.

SUMMARY

This document describes one or more aspects of a vehicle occupancy-monitoring system. In one example, the system includes a controller circuit configured to receive occupant data from an occupancy-monitoring sensor of a vehicle. The controller circuit is also configured to determine an occupancy status of respective seats in a cabin of the vehicle based on the occupancy-monitoring sensor. The controller circuit is also configured to indicate the occupancy status of the respective seats on a display located in a field of view of occupants of the vehicle. The display is integral to one of a roof light module, a door panel, a headliner of the cabin.

In another example, a method includes receiving, with a controller circuit, occupant data from an occupancy-monitoring sensor of a vehicle. The method also includes determining, with the controller circuit, an occupancy status of respective seats in a cabin of the vehicle based on the occupancy-monitoring sensor. The method also includes indicating, with the controller circuit, the occupancy status of the respective seats on a display located in a field of view of occupants of the vehicle, wherein the display is integral to one of a roof light module, a door panel, a headliner of the cabin.

This summary is provided to introduce aspects of a vehicle occupancy-monitoring system, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts but also apply to other environments where cameras can be used to detect objects. This summary is not intended to identify essential features of the claimed subject matter, nor is it intended for use in determining the scope of the claimed subject matter.

BRIEF DESCRIPTION OF THE DRAWINGS

The details of one or more aspects of a vehicle occupancy-monitoring system are described in this document with reference to the following drawings. The same numbers are used throughout the drawings to reference like features and components.

DETAILED DESCRIPTION

Overview

The techniques of this disclosure relate to a vehicle occupancy-monitoring system. A controller circuit receives data from in-cabin sensors that detect whether the seat is occupied and whether the occupant is an adult or a child. The in-cabin sensors also detect whether the occupant is properly wearing a seat belt or whether a child safety seat is properly installed. The system displays an occupancy status of each seat in the vehicle on a lighted display that is visible to all passengers in the vehicle. The occupancy status indicates whether the seat is occupied or unoccupied and whether the passenger is correctly restrained by seat belts or child safety seats. Sections of the display correspond to the seating layout of the vehicle so that not only the driver (or operator) but other passengers can also see which seats are occupied and in compliance with vehicle safety laws. The controller circuit notifies all occupants of the vehicle when a passenger is noncompliant by pulsating the light on the display and increases the intensity of the notifications when the non-compliance continues over time. The vehicle occupancy-monitoring system can improve passenger compliance with wearing seat belts by alerting non-driving occupants to buckle-up.

Example System

Figure 1:
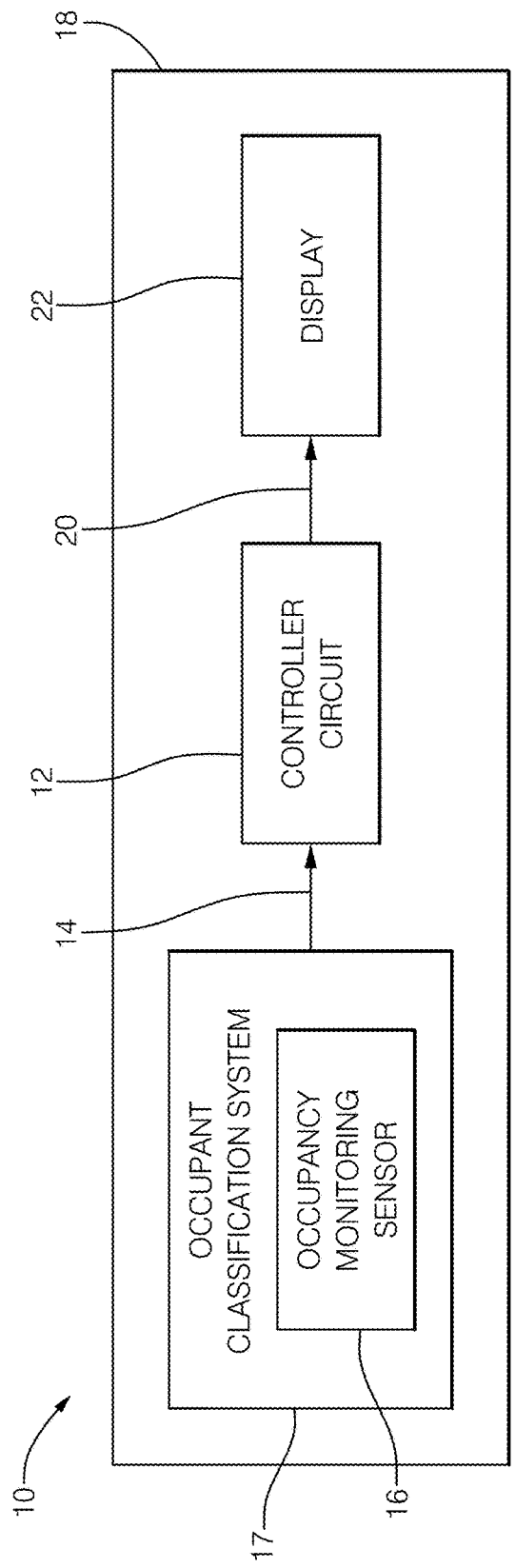
FIG. 1 illustrates an example of a vehicle occupancy-monitoring system.

FIG. 1 illustrates an example of a vehicle occupancy-monitoring system 10, hereafter referred to as the system 10. The system 10 includes a controller circuit 12 configured to receive occupant data 14 from an occupancy-monitoring sensor 16 installed on a vehicle 18. Although the vehicle 18 can be any vehicle, for ease of description, the vehicle 18 is primarily described as being a self-driving automobile that is configured to operate in an autonomous mode without an operator riding onboard the vehicle 18. The controller circuit 12 is configured to determine an occupancy status 20 of respective seats in a cabin of the vehicle 18 based on the occupancy-monitoring sensor 16 and present the occupancy status 20 on a display 22 that is visible to each of the vehicle occupants. In the example illustrated in FIG. 1, the occupancy-monitoring sensor 16 is a component of an occupant classification system 17 (OCS 17) installed on the vehicle 18, which will be explained in more detail below.

In the example illustrated in FIG. 1, the controller circuit 12 is installed on the vehicle 18 and is communicatively coupled to the occupancy-monitoring sensor 16 and the display 22 via transmission links. The transmission links can be wired or wireless interfaces, for example, BLUETOOTH®, Wi-Fi, near field communication (NFC), universal serial bus (USB), universal asynchronous receiver/transmitter (UART), or controller area network (CAN). In some examples, the controller circuit 12 receives data from other vehicle systems via a CAN bus (not shown), for example, an ignition status, a vehicle speed, a vehicle relative motion, and a transmission gear selection.

Controller Circuit

The controller circuit 12 may be implemented as a microprocessor or other control circuitry such as analog and/or digital control circuitry. The control circuitry may include one or more application-specific integrated circuits (ASICs), field-programmable gate arrays (FPGAs) that are programmed to perform the techniques, or one or more general-purpose hardware processors programmed to perform the techniques pursuant to program instructions in firmware, memory, other storage, or a combination. The controller circuit 12 may also combine custom hard-wired logic, ASICs, or FPGAs with custom programming to perform the techniques. The controller circuit 12 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying programming signals. The controller circuit 12 may include other examples of non-volatile memory, such as flash memory, read-only memory (ROM), programmable read-only memory (PROM), and erasable programmable read-only memory (EPROM). The controller circuit 12 may include volatile memory (e.g., dynamic random-access memory (DRAM), static random-access memory (SRAM)). The one or more routines may be executed by the processor to perform steps for determining the occupancy status 20 based on signals received by the controller circuit 12 from the occupancy-monitoring sensor 16 as described herein.

Occupancy-Monitoring Sensor

Figure 2:
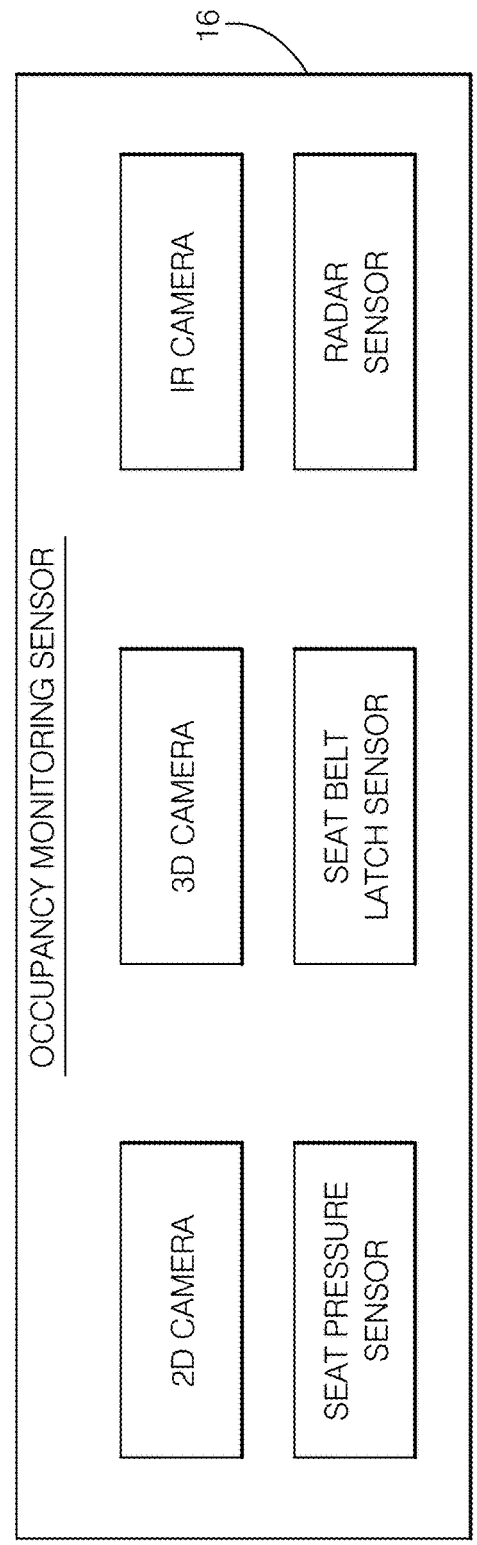
FIG. 2 illustrates an example occupancy-monitoring sensor isolated from the example of a vehicle occupancy-monitoring system of FIG. 1.

FIG. 2 illustrates an example of the occupancy-monitoring sensor 16 that is located remotely from the system 10. The occupancy-monitoring sensor 16 can include one or more sensors that detect an occupancy of a seat in the cabin of the vehicle 18 and can be components of the OCS 17 installed on the vehicle 18. The occupancy-monitoring sensor 16 can include a camera that captures images of the vehicle cabin, and the OCS 17 determines whether the seat is occupied by a person or an inanimate object based on the images. Software in the OCS 17 can distinguish persons from animals and objects using known image-analysis techniques. The objects in the images are detected in regions of interest that correspond to the seating positions within the cabin, and the objects are classified by the software into human and other classifications. Processing blocks or models in the software are pre-trained to recognize human forms or shapes of other objects, for example, a shopping bag, a box, or an animal. The camera can be a two-dimensional (2D) camera or a 3D time-of-flight camera that measures a time for light pulses to leave the camera and reflect back on the camera's imaging array. The camera can be an infrared (IR) camera and can detect a living being or a temperature of an object based on a thermal image captured by the IR camera.

The OCS 17 can use the cameras of the occupancy-monitoring sensor 16 to detect when a seat belt is not properly aligned to the passenger, for example, when a passenger places a shoulder strap under an arm instead of across a shoulder. The OCS 17 can determine the seat-belt alignment by using edge-detection techniques, for example, Kalman filters, to detect the edges of the seat belts and compare the position of the edges to points on the body of the passenger based on the software models.

The OCS 17 can also use the cameras of the occupancy-monitoring sensor 16 to detect when a child safety seat is not properly aligned to the seats, for example, when the child safety seat is forward-facing instead of rear-facing, or when the child safety seat is otherwise installed incorrectly. The OCS 17 can determine the misaligned child safety seat by detecting features of the child safety that indicate the alignment, for example, a longitudinal axis of the child safety seat compared to a vehicle longitudinal axis, or features of the child that may indicate the child is facing a particular direction in relation to the seat.

The occupancy-monitoring sensor 16 can also include a seat-pressure sensor that detects a pressure or pressure distribution applied to the seat. The OCS 17 can determine whether an adult or the child is occupying the seat based on a pressure threshold indicative of a weight of the occupant, and by the distribution of the pressure that can indicate whether a child safety seat is installed. For example, if the weight of the occupant is greater than thirty kilograms, the OCS 17 may determine that the passenger is considered an adult. The OCS 17 can deactivate an air bag, for example, when a child safety seat is detected or when the seat is not occupied by a person. The OCS 17 can also reduce an inflation force of the air bag based on a size and weight of the occupant.

The occupancy-monitoring sensor 16 can also include a seat-belt-latch sensor that detects whether the seat belt is latched, and the OCS 17 can determine whether the passenger occupying the seat requires a latched seat belt (e.g., when the vehicle 18 is in motion). The seat-belt-latch sensor can be a reed sensor located in a latch housing that is actuated when a tongue of the buckle is inserted into the latch housing. The actuated reed sensor completes an electrical circuit that indicates to the OCS 17 that the buckle is properly latched. The OCS 17 can determine, based on the respective electrical circuit, which seat in the cabin corresponds to the latched or unlatched seat belt.

The occupancy-monitoring sensor 16 can also include a radar sensor that detects a presence of objects in the vehicle cabin, and the OCS 17 can determine whether the seat is occupied by the person or the inanimate object based on point cloud data received from the radar sensor. The OCS 17 compares the point cloud data to models in the software to determine whether the seat is occupied by the person or the inanimate object. In some examples, the radar sensor can detect relatively small movements, for example, movements of a chest wall of the passenger that is breathing. The radar sensor can be used to detect the presence of the child that may be seated in the child safety seat and covered where the camera or thermal camera may not detect the child.

The occupant data 14 from the OCS 17 can be periodically updated by the OCS 17 to ensure the controller circuit 12 can accurately determine the occupancy status 20. For example, the OCS 17 can update the occupant data 14 at thirty-second intervals to account for temporary changes in the seat occupancy due to passengers exiting or entering the vehicle.

Occupancy Status

Figure 3:
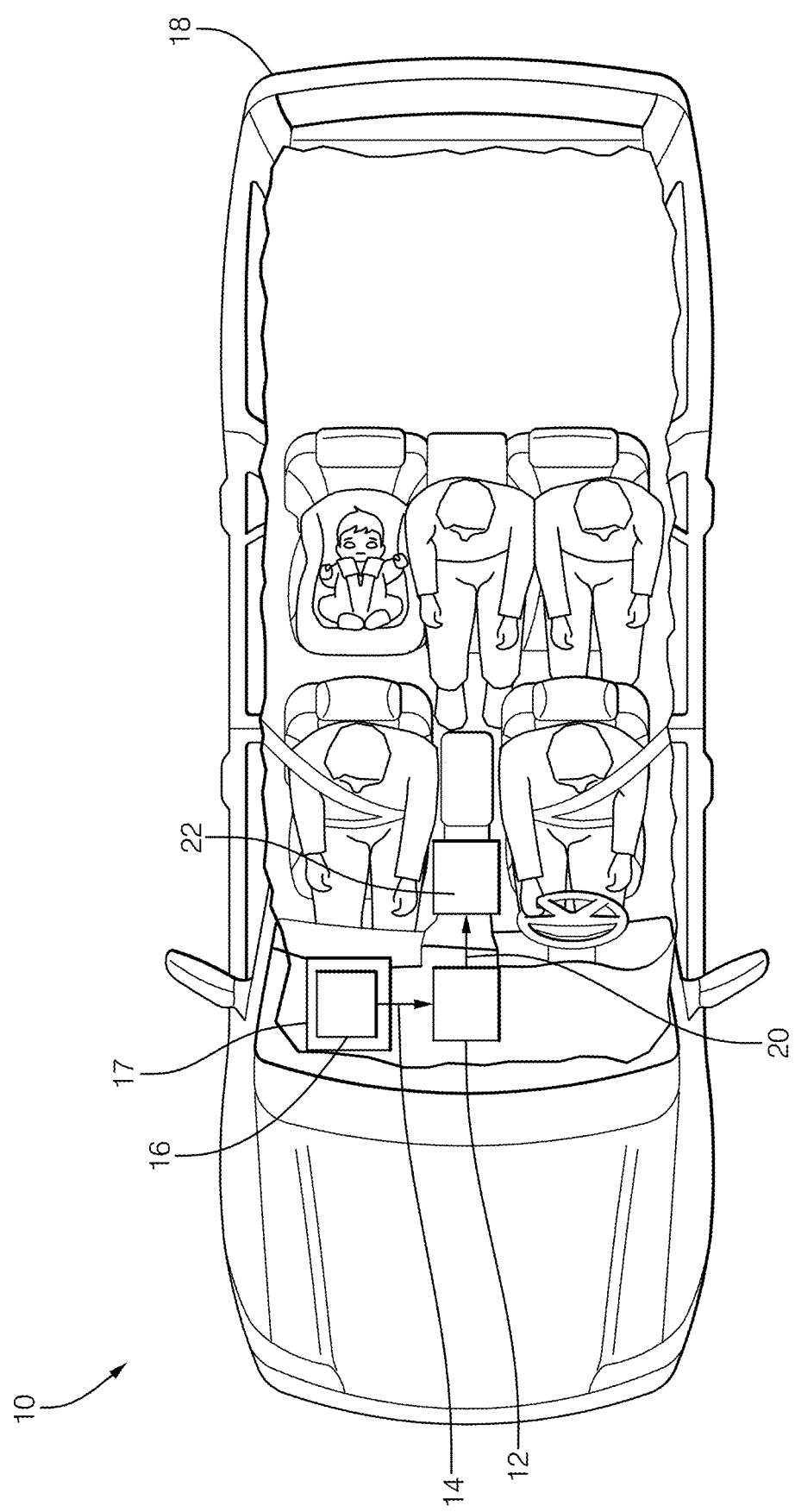
FIG. 3 illustrates an example of the vehicle occupancy-monitoring system of FIG. 1 installed on a vehicle.

FIG. 3 illustrates the system 10 installed on the vehicle 18, including the driver, a front passenger, and three rear passengers. The driver and front passenger are wearing seat belts, and the three rear passengers include a child restrained by a child safety seat and two passengers who are not wearing seat belts. In this example, the display 22 is integral to a roof light module (see FIG. 4) and is located on the interior roof between the driver and front passenger such that the display 22 is visible to all occupants.

The controller circuit 12 is configured to determine the occupancy status 20 of respective seats in the cabin of the vehicle 18 based on the occupant data 14 received from the occupancy-monitoring sensor 16. The occupancy status 20 can be indicative of several occupancy-status parameters that include a seat occupancy, a seat-belt engagement, a seat-belt alignment relative to the occupants, a child safety seat alignment relative to the seat, or any combination thereof.

The seat-occupancy parameter indicates whether the seat is occupied or vacant and whether the seat is occupied by an adult, a child, or an inanimate object. The controller circuit 12 can determine the seat occupancy based on the occupant data 14 from one or more of the devices that are included in the occupancy-monitoring sensor 16. For example, the cameras or radar sensors can capture image or cloud-point data of the seat locations in the cabin, and the OCS 17 can process the data to determine whether the seats are empty or occupied by a person or an object. In some examples, the OCS 17 uses data from the seat-pressure sensor in addition to the image or cloud-point data to support the determination that the seat is occupied. The controller circuit 12 can use the determination of the seat occupancy from the OCS 17 to present the seat-occupancy status on the display 22, as will be described in further detail below.

The seat-belt engagement parameter indicates whether the seat-belt latch is engaged, and the controller circuit 12 can use the determination of the seat-belt latch engagement from the OCS 17 to present a seat-belt engagement status on the display 22.

The seat-belt alignment relative to the occupants parameter indicates whether the occupants are properly restrained by the seat belt, and the controller circuit 12 can use the determination of the seat-belt alignment relative to the occupants from the OCS 17 to present a seat-belt alignment status on the display 22.

The child safety seat alignment relative to the seat parameter indicates whether the child safety seat is properly installed in the seat, as described above. The controller circuit 12 can use the determination of the child safety seat alignment relative to the seats from the OCS 17 to present a child safety seat alignment status on the display 22.

The controller circuit 12 can present the individual occupancy status parameters on the display 22 or can display the occupant status 20 that is indicative of two or more of the occupancy status parameters, as indicated in Table 1 below.

Display

Figure 4:
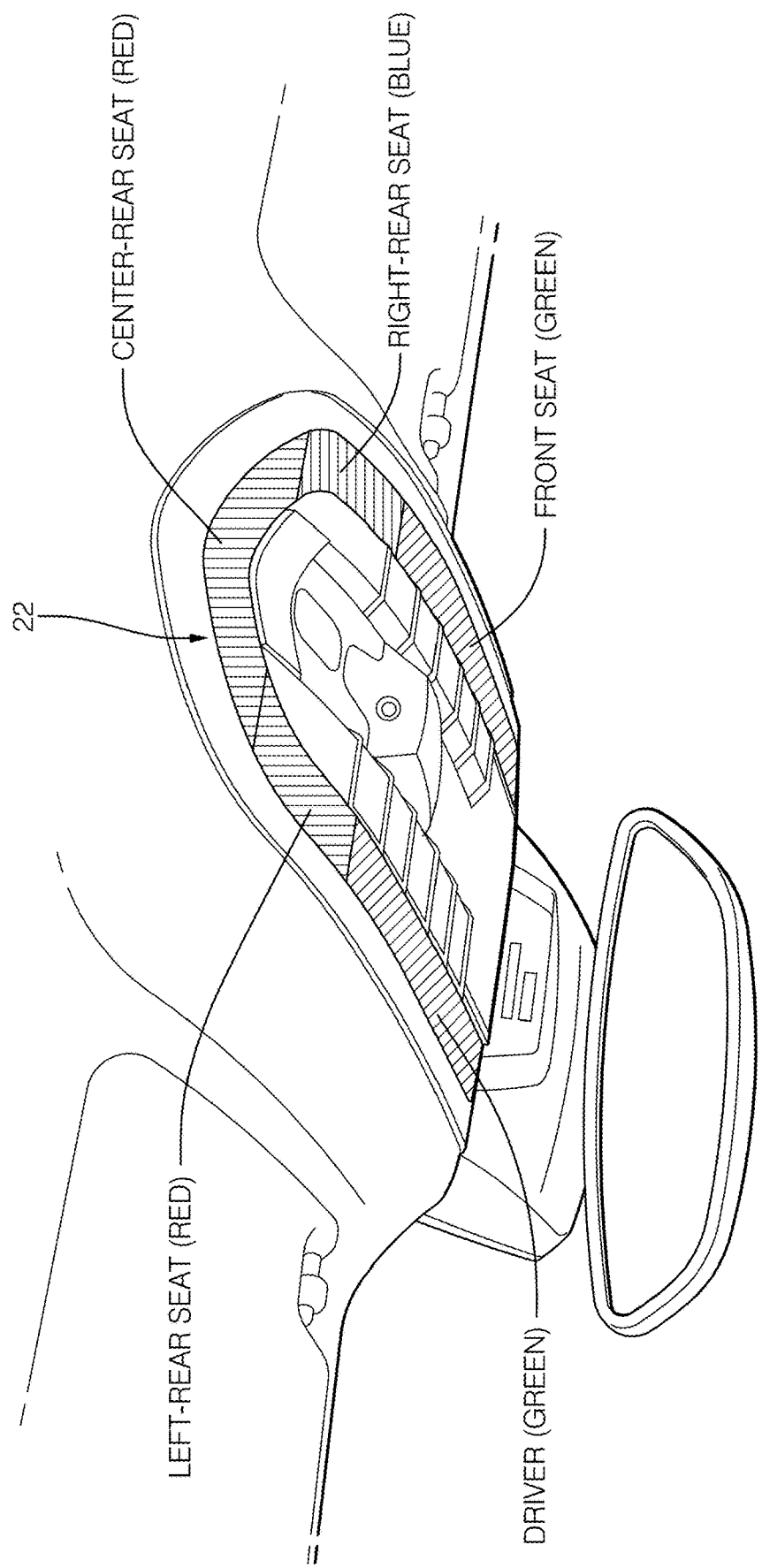
FIG. 4 illustrates an example of a display of the system of FIG. 3 integrated into a roof light module of a vehicle cabin.

FIG. 4 illustrates an example of the display 22 integrated into the roof light module of the vehicle 18 of FIG. 3. In this example, the display includes a U-shaped light bar having segments that correspond to the respective seat locations in the cabin. The light bar can include different light-emitting diodes (LEDs) configured to illuminate different colors of light based on signals received from the controller circuit 12.

In the example illustrated in FIG. 4, the light bar has five segments that correspond to the two front seats and the three rear seats. The controller circuit 12 is configured to indicate the occupancy status 20 of the respective seats by controlling the color of light displayed on the light bar segments. In this example, both the driver and front passenger are seated with their seat belts latched (see FIG. 3), and the controller circuit 12 indicates the occupancy status 20 by illuminating a green light on the display segments that correspond to the driver and front passenger seats. Both the left-rear and center-rear passengers are seated without their seat belts latched, and the controller circuit 12 indicates the occupancy status 20 by illuminating red lights on the display segments that correspond to the left- and center-rear seats. The right-rear passenger is a child that is seated and properly restrained in a child safety seat, and the controller circuit 12 indicates the occupancy status 20 by illuminating a blue light on the display segment that corresponds to the right-rear seat. Table 1 below illustrates examples of the light color and the corresponding occupancy status 20. It will be appreciated that other light colors can be illuminated on the display that correspond to other objects, for example, packages or animals, or additional occupancy status indicators (e.g., occupant out of position, occupant health, or occupant level of awareness). The light colors can be predetermined by the vehicle manufacturer or can be selected by the vehicle operator based on the operator's preferences.

TABLE 1

EXAMPLE DISPLAY LIGHT COLORS

| OCCU-PANCY STATUS | ILLUMINATION | | | | | |
|---|---|---|---|---|---|---|
| | OFF | GREEN | RED | YEL-LOW | BLUE | OR-ANGE |
| SEAT OCCU-PANCY | UN-OC-CU-PIED | ADULT | ADULT | ADULT | CHILD | CHILD |
| SEAT-BELT ENGAGE-MENT | | EN-GAGED | DISEN-GAGED | EN-GAGED | EN-GAGED | DISEN-GAGED |
| SEAT-BELT ALIGN-MENT | | ALIGN-ED | | MIS-ALIGN-ED | ALIGN-ED | MIS-ALIGN-ED |
| CHILD SAFETY SEAT ALIGN-MENT | | | | | ALIGN-ED | MIS-ALIGN-ED |

Figure 5:
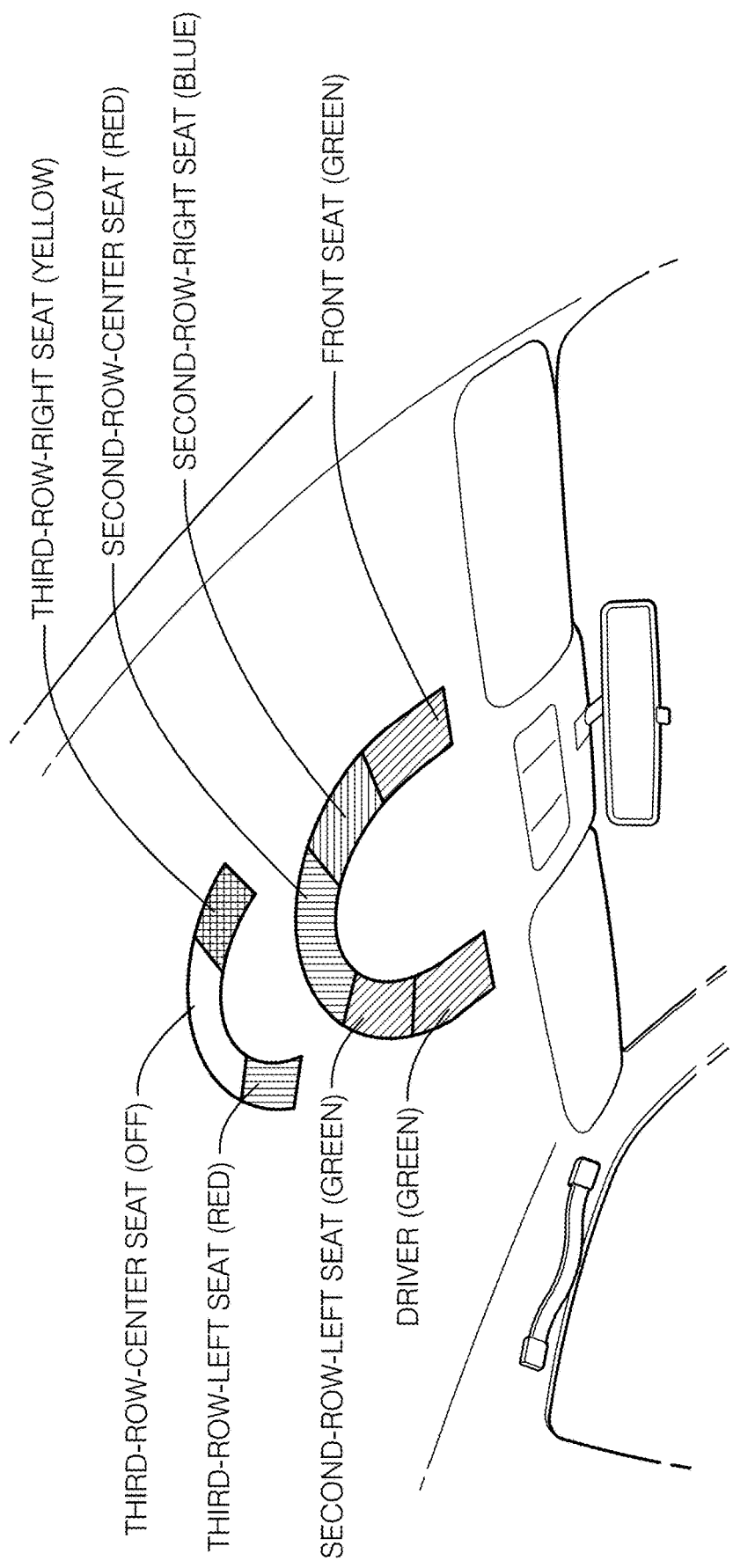
FIG. 5 illustrates another example of a display of the system of FIG. 1 integrated into a headliner of the vehicle cabin.

The display 22 can be located in different parts of the vehicle 18 other than the roof light module. FIG. 5 illustrates an example of the display 22 integrated into a headliner of the vehicle's interior. The display 22 is positioned forward in the vehicle cabin and is in view of all passengers. In this example, the vehicle 18 includes a third-row seating option, and the display includes a second light bar ring to indicate the occupancy status 20 of the third row. The occupancy status 20 of the front- and second-row seats are the same as those described in FIG. 4. In this example, the passenger in the third-row left seat is an adult who is not wearing the seat belt, and the controller circuit 12 illuminates the corresponding light bar segment red. The passenger in the third-row right seat is wearing a mis-aligned seat belt (e.g., shoulder strap behind the back), and the controller circuit 12 illuminates the corresponding light bar segment yellow. The third-row center seat is unoccupied, and the controller circuit 12 does not illuminate the corresponding light bar segment.

Figure 6:
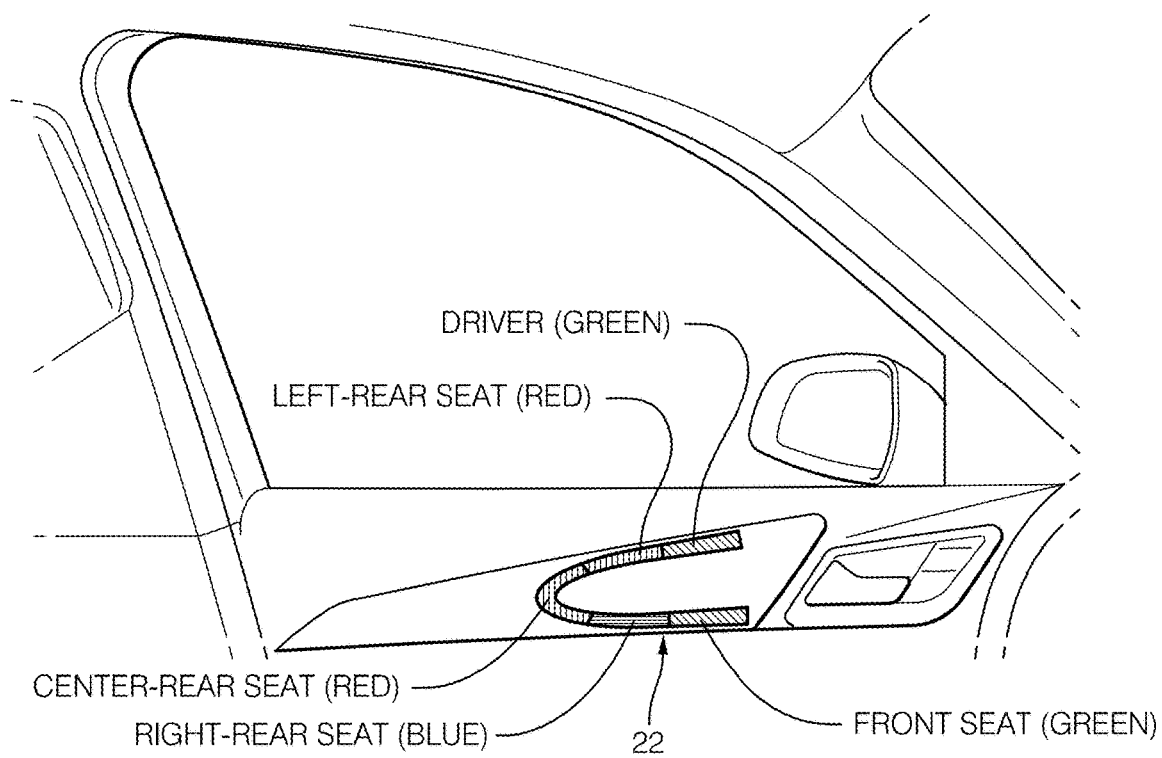
FIG. 6 illustrates another example of a display of the system of FIG. 1 integrated into a door panel of the vehicle's interior.

FIG. 6 illustrates an example of the display 22 integrated into a door panel of the vehicle's interior. In this example, only the driver's side door is illustrated, and the other vehicle door panels include additional displays 22 so that all passengers can view the occupancy status 20. In this example, the occupancy status 20 indicated on the display corresponds to the passenger seating example of FIG. 3.

Figure 7:
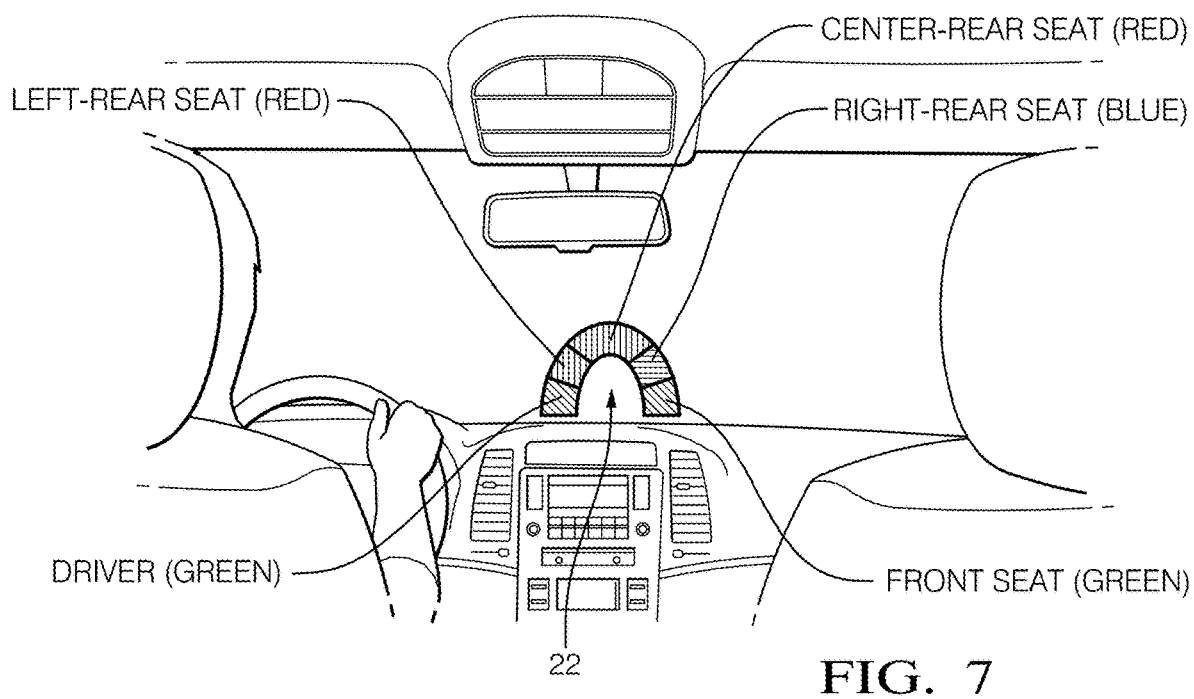
FIG. 7 illustrates another example of a display of the system of FIG. 1 projected onto a windshield of the vehicle.

FIG. 7 illustrates an example of the display being projected on a windshield of the vehicle, for example, a heads-up display. The display is semi-transparent and is projected at a location on the windshield such that the display is visible to all passengers. In this example, the occupancy status 20 indicated on the display corresponds to the passenger seating example of FIG. 3. In some examples, the projection can include text that identifies the seat location within the field of each color segment and enables the occupants to read the respective seat locations associated with color segment. For example, the green segment associated with the driver's seat can include the text, "DRIVER'S SEAT," and the blue segment associated with the right-rear seat can include the text, "RIGHT-REAR SEAT." In other examples, the text can include an identification of a type of passenger occupying the seat, for example, the blue segment can include the text, "CHILD."

Figure 8:
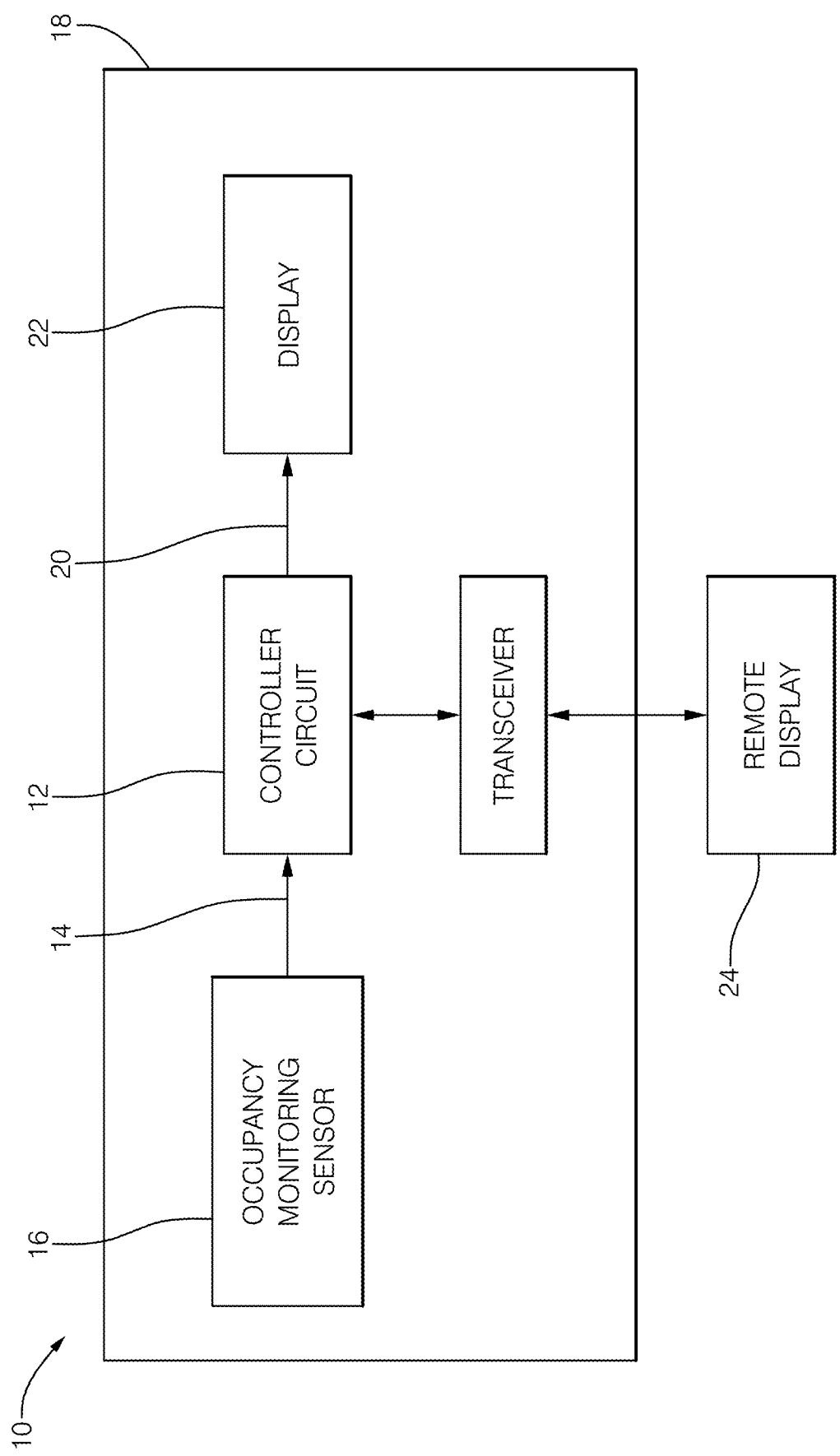
FIG. 8 illustrates another example of a vehicle occupancy-monitoring system including a remote display.
Figure 9:
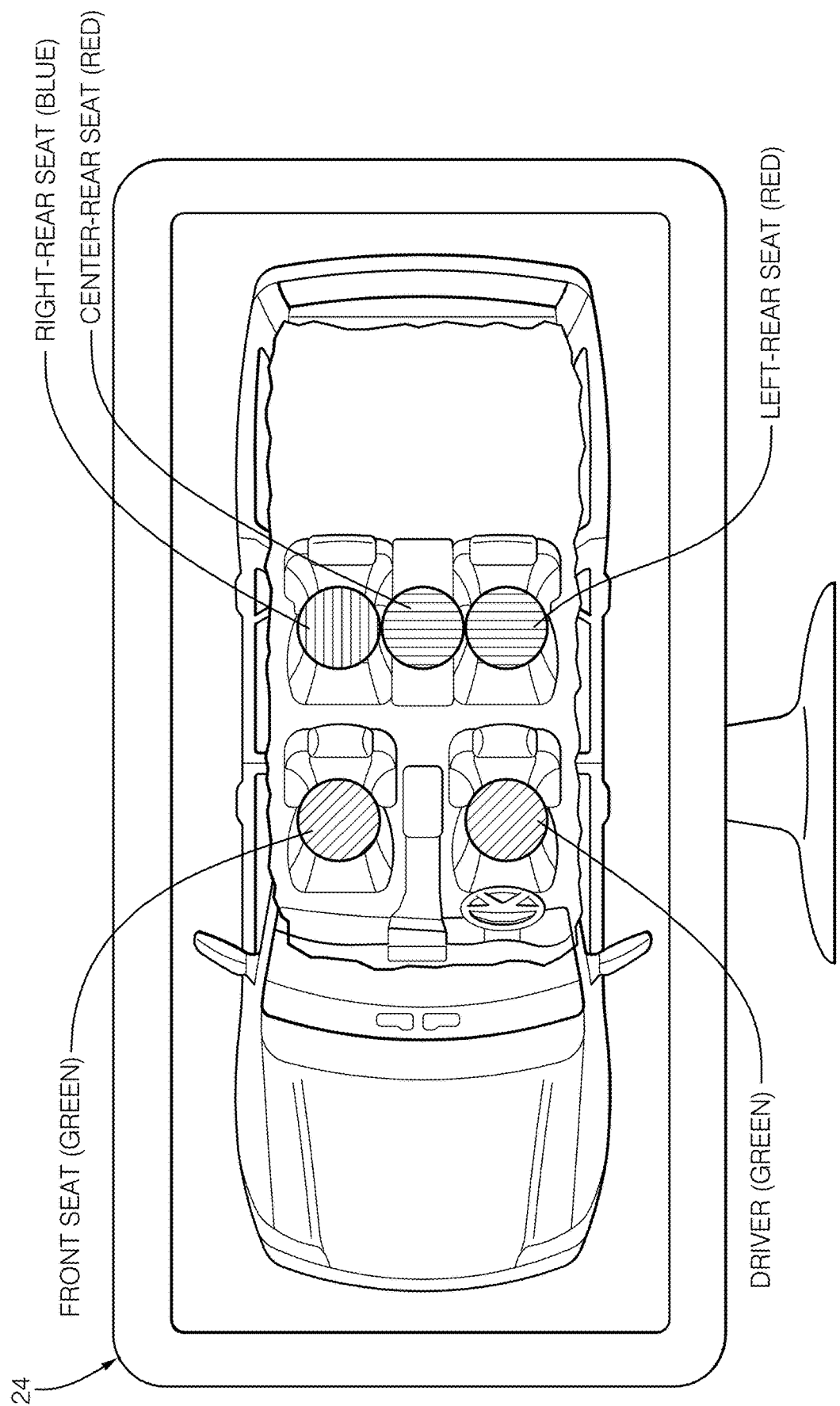
FIG. 9 illustrates an example of the remote display of FIG. 8.

FIG. 8 illustrates an example of the display 22 being duplicated at a monitoring facility remote from the vehicle 18. For example, when the vehicle 18 is a driverless vehicle operated by a taxi service or ride-sharing service, the vehicle operator located at the remote facility can monitor the occupancy status 20 of the passenger seats. This remote monitoring can be beneficial for the operator to understand the vehicle's 18 passenger capacity and current utilization, in addition to monitoring safety issues of seat belt use. In this example, the system 10 includes a transceiver, and the controller circuit 12 is configured to transmit the occupancy status 20 to the remote display 24 via a cellular network or other wireless network. The vehicle operator can use the occupancy status 20 indicated by the remote display 24 to schedule additional passenger pick-ups or control the vehicle 18 in the event of safety violations. For example, the operator can stop the vehicle if it is determined that a passenger is not wearing the seat belt or issue notifications to the passengers of the vehicle 18 that may not be properly restrained while the vehicle 18 is in motion. The remote display 24 can be an image of the light bar that is displayed on a computer monitor that replicates the display 22 mounted inside the vehicle, or can be an image of the vehicle's 18 seating layout that changes the color of the seats corresponding to their occupancy status 20. FIG. 9 illustrates an example of the remote display 24 that corresponds to the passenger seating example of FIG. 3.

Notifications

The controller circuit 12 can use the light color or illumination effects to provide notifications about the occupancy status 20 of the respective seats in the vehicle 18, for example, when the seat belt is unlatched or misaligned, or when the child safety seat is misaligned or improperly installed. Referring back to FIG. 4, the controller circuit 12 can notify the driver of the vehicle 18 when the passengers are determined to be improperly restrained in their seats. In addition to the controller circuit 12 statically illuminating the light bar segments with the red light, the controller circuit 12 can further notify the driver when the seat-belt engagement is determined to be unlatched by pulsating the red lights. When the occupancy status 20 is determined to conflict with vehicle safety laws (e.g., passengers not wearing seat belts) for a time duration exceeding a threshold, the controller circuit 12 can increase an intensity of the notifications. For example, when the seat belt is unlatched for more than 60 seconds while the vehicle 18 is moving, the controller circuit can increase a frequency of the pulsations of the red light. If the driver or passenger ignores the pulsating light notification, the controller circuit 12 can continue to increase the pulsation frequency until the seat belt is fastened.

Figure 10:
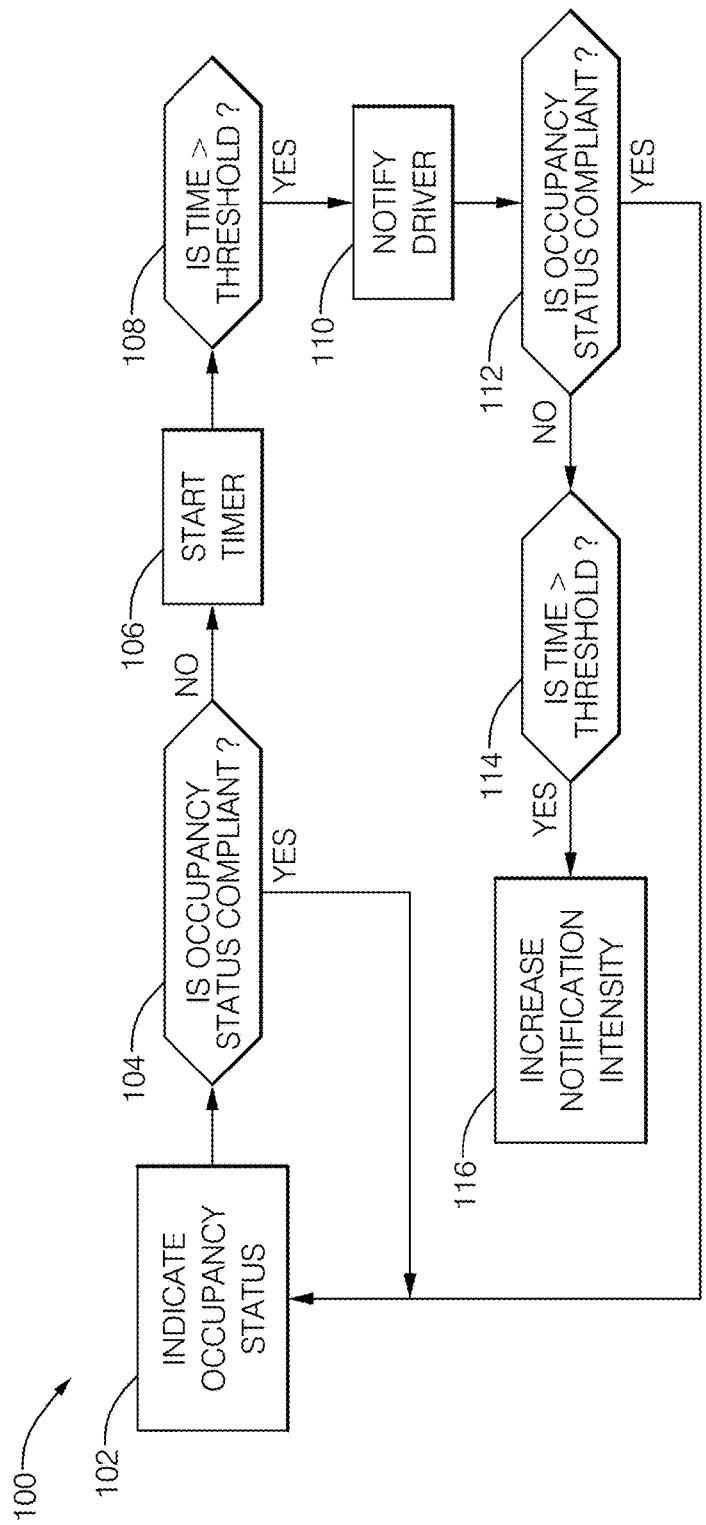
FIG. 10 is an example flow chart of an example logic flow performed by a controller circuit of the system of FIG. 1.

FIG. 10 is a flow diagram illustrating an example logic flow 100 performed by the controller circuit 12. The logic flow starts at 102 with indicating the occupancy status 20 on the display 22 upon vehicle ignition and ends at 116 with increasing the notification intensity. In this example, at 102, upon the driver actuating a vehicle ignition switch inside the vehicle 18, the OCS 17 determines the occupancy status 20 of the respective seats in the vehicle 18 and transfers the occupancy data 14 to the controller circuit 12 via the transmission link. The controller circuit 12 indicates the occupancy status 20 on the display 22, as illustrated in the examples in Table 1, and at 104, determines whether any occupancy status parameter is noncompliant with vehicle safety laws. Examples of noncompliant occupancy status parameters are, for example, unlatched seat belts while the vehicle 18 is moving, misaligned seat belts, and misaligned or mis-installed child safety seats.

At 106, the controller circuit 12 starts a timer for any occupancy status parameter that is noncompliant. The controller circuit 12 can start timers for any number of occupancy status indicators that are noncompliant, for example, a first timer for the unlatched seat belt, a second timer for the misaligned seat belt, and a third timer for the misaligned child safety seat.

At 108, the controller circuit 12 determines whether a time duration of the noncompliant occupancy status parameter is greater than a threshold. If the time is greater than the threshold, at 110, the controller circuit 12 sends a first notification to the driver. The first notification can be the pulsating light for the light bar segment that corresponds to the seat indicating the noncompliant occupancy-status parameter. For example, the controller circuit 12 can pulsate the yellow light on the light bar to notify the driver of the misaligned seat belt and can pulsate the orange light to notify the driver of the misaligned child safety seat. At 112, the controller circuit 12 again determines whether the occupancy-status parameter is noncompliant. If the occupancy status parameter is compliant, the controller circuit 12 indicates the status on the display, and if the occupancy status parameter remains noncompliant, at 114, the controller circuit 12 again determines whether the time is greater than the threshold. If the time is greater than the threshold, at 116, the controller circuit 12 increases the intensity of the notification to the driver, for example, by increasing the pulsation frequency of the light on the light bar.

The controller circuit 12 can use other notification methods in addition to the light color and effects, for example, voice notifications and haptic or vibrational notifications. For example, the voice notifications can call out the specific seat and the specific noncompliant occupancy-status parameter with a message audible to all vehicle occupants. The haptic notifications can be applied to the seat of the passenger that is noncompliant and can also vibrate the driver's seat. In some examples, a portion of the driver's seat that corresponds to the noncompliant seat position can be vibrated. For example, vibrating a right shoulder portion of the driver's seat-back can indicate the right-rear passenger is noncompliant, and vibrating the left front portion of the driver's seat-bottom can indicate that the driver is noncompliant. These other notification methods can also be escalated by increasing the intensity, for example, by increasing a volume of the voice notification, increasing the frequency of the repeated voice notification, and vibrating the driver's and passenger's seats with increasing frequency or amplitude.

Example Method

Figure 11:
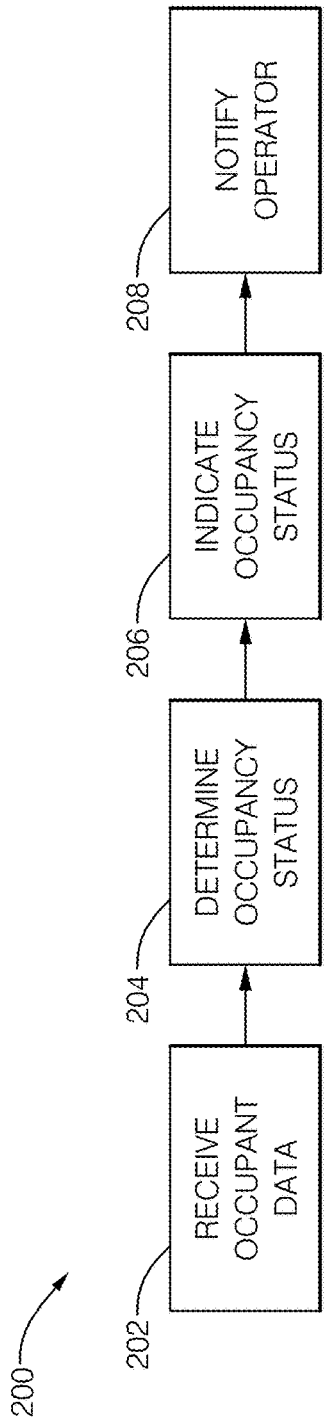
FIG. 11 is an example method of operating the example vehicle occupancy-monitoring system of FIG. 1.

FIG. 11 illustrates example methods 200 performed by the system 10. For example, the controller circuit 12 configures the system 10 to perform operations 202 through 208 by executing instructions associated with the controller circuit 12. The operations (or steps) 202 through 208 are performed but not necessarily limited to the order or combinations in which the operations are shown herein. Further, any of one or more of the operations may be repeated, combined, or reorganized to provide other operations.

Step 202 includes RECEIVE OCCUPANT DATA. This can include receiving, with the controller circuit 12, occupant data 14 from the occupancy-monitoring sensor 16 installed on the vehicle 18 via the transmission link. The occupancy-monitoring sensor 16 can include multiple sensors that detect the occupancy of the seats in the vehicle 18 and can be components of the OCS 17, as described above. The occupancy-monitoring sensor 16 can include 2D cameras, 3D cameras, and IR cameras that capture video or thermal images of the vehicle cabin, and the OCS 17 determines whether the seat is occupied by the person or the inanimate object based on the images, as described above. The occupancy-monitoring sensor 16 can also include the radar sensor that detects the presence of objects in the seats and can detect the presence of the child that may be covered and not visible to the cameras, as described above. The OCS 17 can use the cameras to detect when the seat belt is not properly aligned to the passenger or instances of misaligned child safety seats, as described above. The occupancy-monitoring sensor 16 can also include seat-pressure sensors that detect when the adult, the child, or the inanimate object are occupying the seat and can include seat-belt-latch sensors that detect whether the seat belts of the occupied seats are latched, as described above. The occupant data 14 can be periodically updated by the OCS 17 and transferred to the controller circuit 12 to ensure the controller circuit 12 can accurately determine the occupancy status 20.

Step 204 includes DETERMINE OCCUPANCY STATUS. This can include determining, with the controller circuit 12, the occupancy status 20 of the respective seats in the vehicle 18 based on the occupant data 14 received from the OCS 17. The occupancy status 20 includes the seat occupancy, the seat-belt engagement, the seat-belt alignment relative to the occupants, and the child safety seat alignment relative to the seats, as described above. The seat occupancy indicates whether the seat is occupied by the adult, the child, the inanimate object, or is unoccupied. The controller circuit 12 determines whether the seat is occupied or unoccupied based on the occupant data 14 from the cameras, radar sensors, and the seat-pressure sensors. The controller circuit 12 determines whether the seat-belt latch is engaged or disengaged based on the data received from the seat-belt-latch sensor. The controller circuit 12 determines whether the seat belt is aligned or misaligned based on the data received from the cameras of the OCS 17. The controller circuit 12 determines whether the child safety seat is aligned or misaligned and whether the child safety seat is properly installed in the seat based on the data received from the cameras, seat-pressure sensors, and seat-belt-latch sensors, as described above.

Step 206 includes INDICATE OCCUPANCY STATUS. This can include indicating, with the controller circuit 12, the occupancy status 20 on the display 22 in view of the vehicle occupants. The display 22 can be integral to the roof light module as illustrated in FIG. 4, the headliner of the cabin as illustrated in FIG. 5, or the door panel as illustrated in FIG. 6. The controller circuit 12 indicates the occupancy status 20 of the respective seats by controlling the color of light illuminated on the display 22, as shown above in Table 1. The display 22 includes the light bar having segments that correspond to the respective seat locations in the cabin. The light bar can include different LEDs configured to illuminate different colors of light based on signals received from the controller circuit 12, as described above. The display 22 can be duplicated at a remote monitoring facility where the vehicle operator of the driverless vehicle operated by a taxi service or ride-sharing service can monitor the occupancy status 20 of the passenger seats, as described above.

Step 208 includes NOTIFY OPERATOR. This can include notifying, with the controller circuit 12, the driver or operator of the vehicle 18 about the occupancy status 20 of the respective seats in the vehicle 18. The notifications can include the seat belt being unlatched or misaligned, and the child safety seat being misaligned or improperly installed, as described above. The controller circuit 12 uses the light color and illumination effects to provide notifications to the operator when the controller circuit 12 determines whether any occupancy-status parameter is noncompliant with vehicle safety laws, for example, unlatched seat belts, misaligned seat belts, and misaligned or mis-installed child safety seats. The controller circuit 12 can pulsate the lights on the light bar to indicate to the operator that the occupancy status 20 is determined to conflict with vehicle safety laws and can increase the intensity of the notifications when the noncompliance exists for a time period exceeding a threshold, as described above. The controller circuit 12 can notify the operator using the light color and effects, voice notifications, and haptic or vibrational notifications, as described above.

EXAMPLES

In the following section, examples are provided.

Example 1. A system, comprising: a controller circuit configured to: receive occupant data from an occupancy-monitoring sensor of a vehicle; determine an occupancy status of respective seats in a cabin of the vehicle based on the occupancy-monitoring sensor; and indicate the occupancy status of the respective seats on a display located in a field of view of occupants of the vehicle, wherein the display is integral to one of a roof light module, a door panel, a headliner of the cabin.

Example 2. The system of the previous example, wherein the display is duplicated at a monitoring facility remote from the vehicle.

Example 3. The system of any of the previous examples, wherein the display comprises lighting configured to change a color of light displayed and the controller circuit is further configured to change the color of light displayed based on the occupancy status of the respective seats.

Example 4. The system of any of the previous examples, wherein the display is projected on a windshield of the vehicle.

Example 5. The system of any of the previous examples, wherein the occupancy-monitoring sensor is one or more of a camera, a seat-pressure sensor, and a seat-belt-latch sensor, and a radar sensor.

Example 6. The system of any of the previous examples, wherein determining the occupancy status includes determining one or more of a seat occupancy, a seat-belt engagement, a seat-belt alignment relative to the occupants, and a child safety seat alignment relative to the seats.

Example 7. The system of any of the previous examples, wherein the seat occupancy includes one or more of an occupied seat, a vacant seat, a presence of an adult, the presence of a child, and the presence of an inanimate object.

Example 8. The system of any of the previous examples, wherein the controller circuit is further configured to notify an operator of the vehicle when the seat-belt engagement is determined to be unlatched.

Example 9. The system of any of the previous examples, wherein the controller circuit is further configured to notify the operator of the vehicle when the seat-belt alignment is determined to be misaligned.

Example 10. The system of any of the previous examples, wherein the controller circuit is further configured to notify the operator of the vehicle when the child safety seat alignment is determined to be misaligned.

Example 11. The system of any of the previous examples, wherein the notifications to the operator include one of a voice notification, a light color, and a haptic notification.

Example 12. The system of any of the previous examples, wherein an intensity of the notifications increase when the occupancy status is determined to conflict with vehicle safety laws for a time duration exceeding a threshold.

Example 13. A method, comprising: receiving, with a controller circuit, occupant data from an occupancy-monitoring sensor of a vehicle; determining, with the controller circuit, an occupancy status of respective seats in a cabin of the vehicle based on the occupancy-monitoring sensor; and indicating, with the controller circuit, the occupancy status of the respective seats on a display located in a field of view of occupants of the vehicle, wherein the display is integral to one of a roof light module, a door panel, a headliner of the cabin.

Example 14. The method of the previous example, including indicating the occupancy status, with the controller circuit, by changing a color of light displayed on the display corresponding to the occupancy status of the respective seats.

Example 15. The method of any of the previous examples, including determining the occupancy status by determining one or more of a seat occupancy, a seat-belt engagement, a seat-belt alignment relative to the occupants, and a child safety seat alignment relative to the seats.

Example 16. The method of any of the previous examples, including determining the seat occupancy by determining one or more of an occupied seat, a vacant seat, a presence of an adult, the presence of a child, and the presence of an inanimate object.

Example 17. The method of any of the previous examples, including notifying, with the controller circuit, an operator of the vehicle when the seat-belt engagement is determined to be unlatched.

Example 18. The method of any of the previous examples, including notifying, with the controller circuit, the operator of the vehicle when the seat-belt alignment is determined to be misaligned.

Example 19. The method of any of the previous examples, including notifying, with the controller circuit, the operator of the vehicle when the child safety seat alignment is determined to be misaligned.

Example 20. The method of, including increasing an intensity of the notifications, with the controller circuit, when the occupancy status is determined to conflict with vehicle safety laws for a time duration exceeding a threshold, wherein the notifications to the operator include one of a voice notification, a light color, and a haptic notification.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A vehicle system, comprising:
   a cabin having at least two rows of individual seats;
   a display comprising adjacent indicators forming a continuous geometric pattern that is integral to at least one of a roof light module, a door panel, or a headliner, and positioned to be visible from any of the individual seats;
   an occupancy-monitoring sensor; and
   a controller circuit configured to:
   receive occupant data from the occupancy-monitoring sensor;
   determine, based on the occupant data, a respective occupancy status at each of the individual seats; and
   indicate the respective occupancy status at each of the individual seats using different indicators in the geometric pattern to cause the respective occupancy status at each one of the individual seats to be visible from any of the individual seats.

2. The vehicle system of claim 1, wherein the display is duplicated at a monitoring facility remote from the vehicle.

3. The vehicle system of claim 1, wherein the display comprises lighting for each of the adjacent indicators, the lighting configured to change a color of light displayed and the controller circuit is further configured to change the color of light displayed based on the respective occupancy status at each of the individual seats in the cabin.

4. The vehicle system of claim 3, wherein the controller circuit is further configured to project the respective occupancy status at each of the individual seats on a windshield of the vehicle.

5. The vehicle system of claim 1, wherein the occupancy-monitoring sensor is one or more of a camera, a seat-pressure sensor, and a seat-belt-latch sensor, and a radar sensor.

6. The vehicle system of claim 1, wherein the controller circuit is configured to determine the occupancy status by determining one or more of a seat occupancy at that seat, a seat-belt engagement at that seat, a seat-belt alignment relative to that seat, and a child safety seat alignment relative to that seat.

7. The vehicle system of claim 6, wherein the seat occupancy at that seat indicates one or more of an occupied seat, a vacant seat, a presence of an adult, the presence of a child, and the presence of an inanimate object.

8. The vehicle system of claim 6, wherein the controller circuit is further configured to notify an operator of the vehicle when the seat-belt engagement at that seat is determined to be unlatched.

9. The vehicle system of claim 8, wherein the controller circuit is further configured to notify the operator of the vehicle when the seat-belt alignment is determined to be misaligned.

10. The vehicle system of claim 9, wherein the controller circuit is further configured to notify the operator of the vehicle when the child safety seat alignment is determined to be misaligned.

11. The vehicle system of claim 10, wherein the controller circuit is further configured to notify the operator using one of a voice notification, a light color notification, and a haptic notification.

12. The vehicle system of claim 11, wherein the controller circuit is further configured to notify the operator by increasing an intensity of notifications when the occupancy status is determined to conflict with vehicle safety laws for a time duration exceeding a threshold.

13. A method, comprising:
 receiving, with a controller circuit, occupant data from an occupancy-monitoring sensor of a vehicle with a cabin having at least two rows of individual seats and at least one of a roof light module, a door panel, or a headliner;
 determining, with the controller circuit, based on the occupant data, a respective occupancy status at each of the individual seats; and
 indicating, with the controller circuit, on a display integral to the at least one of a roof light module, a door panel, or a headliner, the respective occupancy status at each of the individual seats using different indicators in a geometric pattern on the display to cause the respective occupancy status at each one of the individual seats to be visible from any of the individual seats.

14. The method of claim 13, wherein indicating the respective occupancy status at each of the individual seats comprises indicating the respective occupancy status by changing a color of light displayed using each of the different indicators to correspond to the respective occupancy status at that seat.

15. The method of claim 13, wherein determining the respective occupancy status at each of the seats comprises determining one or more of a seat occupancy at that seat, a seat-belt engagement at that seat, a seat-belt alignment relative to that seat, and a child safety seat alignment relative to that seat.

16. The method of claim 15, further comprising determining the seat occupancy at that seat by determining one or more of an occupied seat, a vacant seat, a presence of an adult, the presence of a child, and the presence of an inanimate object.

17. The method of claim 15, further comprising notifying, with the controller circuit, an operator of the vehicle when the seat-belt engagement at that seat is determined to be unlatched.

18. The method of claim 17, further comprising notifying, with the controller circuit, the operator of the vehicle when the seat-belt alignment at that seat is determined to be misaligned.

19. The method of claim 18, further comprising notifying, with the controller circuit, the operator of the vehicle when the child safety seat alignment at that seat is determined to be misaligned.

20. The method of claim 19, further comprising increasing an intensity of notifying of the operator with the controller circuit, when the respective occupancy status at an individual seat in the cabin is determined to conflict with vehicle safety laws for a time duration exceeding a threshold,
 wherein notifying of the operator with the controller circuit comprises notifying, with the controller circuit, the operator using one or more of a voice notification, a light color, and a haptic notification.

* * * * *